US012705084B2

(12) United States Patent
Soumpholphakdy et al.

(10) Patent No.: US 12,705,084 B2
(45) Date of Patent: Aug. 11, 2026

(54) MIGRATING A FUNCTION BETWEEN VIRTUAL MACHINES

(71) Applicant: Dell Products, L.P., Round Rock, TX (US)

(72) Inventors: Steven Soumpholphakdy, Chicago, IL (US); David Leimbach, Mechanicsburg, PA (US); Michael Burriss, Raleigh, NC (US); Raymond Ramsden, Seattle, WA (US); Chris Zhu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 496 days.

(21) Appl. No.: 18/340,672

(22) Filed: Jun. 23, 2023

(65) Prior Publication Data

US 2024/0427620 A1 Dec. 26, 2024

(51) Int. Cl.
*G06F 9/455* (2018.01)

(52) U.S. Cl.
CPC .................... *G06F 9/45558* (2013.01); *G06F 2009/45562* (2013.01); *G06F 2009/4557* (2013.01); *G06F 2009/45575* (2013.01)

(58) Field of Classification Search
CPC ......... G06F 9/45558; G06F 2009/4557; G06F 2009/45562
See application file for complete search history.

(56) References Cited

U.S. PATENT DOCUMENTS

| | | | | |
|---|---|---|---|---|
| 10,572,285 | B2 * | 2/2020 | Jian | H04L 67/34 |
| 10,809,998 | B2 * | 10/2020 | Gopalapura Venkatesh | G06F 3/0689 |
| 2017/0150399 | A1 * | 5/2017 | Kedalagudde | H04L 41/40 |
| 2018/0157521 | A1 * | 6/2018 | Arikatla | G06F 9/45558 |

* cited by examiner

*Primary Examiner* — Lewis A Bullock, Jr.
*Assistant Examiner* — John Robert Dakita Ewald
(74) *Attorney, Agent, or Firm* — Amin, Turocy & Watson, LLP

(57) ABSTRACT

The technologies described herein are generally directed toward migrating a function between virtual machines. In an embodiment, a method can include identifying a cluster for scaling, deployed using a first node device of a set of node devices supporting the cluster, wherein the first node device has a first virtual machine deployed thereon to support a function of functions of the cluster. The method can further include, based on a scaling specification, deploying, by the system, a second virtual machine on a second node device. Finally, the method can include, based on the scaling specification, migrating, by the system, the function, from the first virtual machine to the second virtual machine.

20 Claims, 10 Drawing Sheets

CLIENT DEVICE 320

325

Throughput Scaling Request

330

Customer UI

ENGINE INPUTS 332A

340

RULE ENFORCER 342

Enforce Rule

Apply rules by generating Inputs and provide Inputs to Orchestration Engine to Trigger Throughput Scaling Sequence

ENGINE INPUTS 332B

350

Policy Rules

Monitoring System

Checks Telemetry Data against Policy Rules provided by the user. If exceeded, pass off rules to be enforced

TELEMETRY DATA 422

CLUSTER MONITOR 346

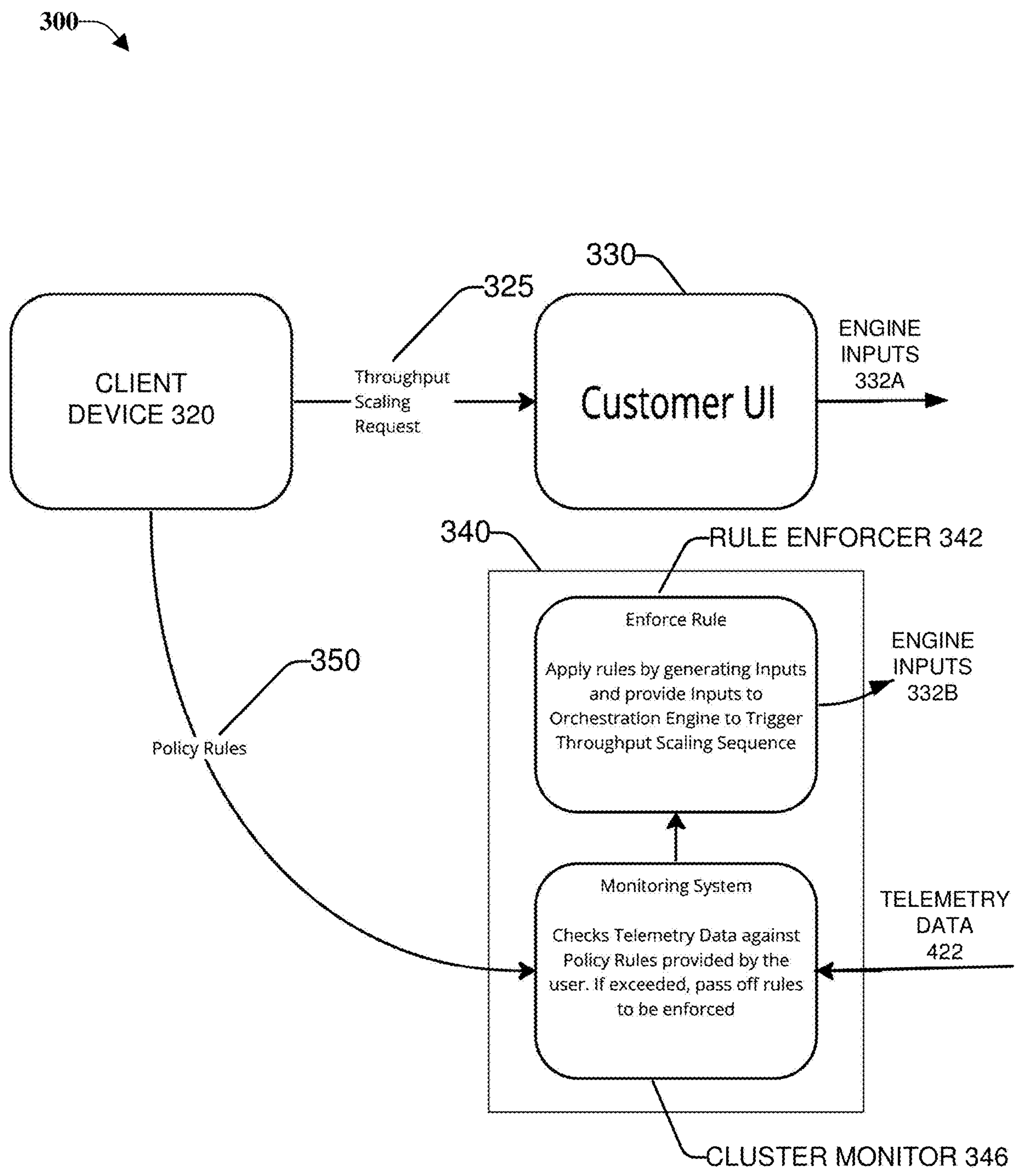

OPERATION 802

IDENTIFYING A CLUSTER FOR SCALING, WITH THE CLUSTER BEING DEPLOYED USING A FIRST NODE DEVICE OF A SET OF NODE DEVICES SUPPORTING THE CLUSTER, WITH THE FIRST NODE DEVICE HAVING A FIRST VIRTUAL MACHINE DEPLOYED THEREON TO SUPPORT A FUNCTION OF FUNCTIONS OF THE CLUSTER

OPERATION 804

BASED ON A SCALING SPECIFICATION, DEPLOY A SECOND VIRTUAL MACHINE ON A SECOND NODE DEVICE

OPERATION 804

BASED ON THE SCALING SPECIFICATION, MIGRATE THE FUNCTION FROM THE FIRST VIRTUAL MACHINE TO THE SECOND VIRTUAL MACHINE

NON-TRANSITORY MACHINE-READABLE MEDIUM 810

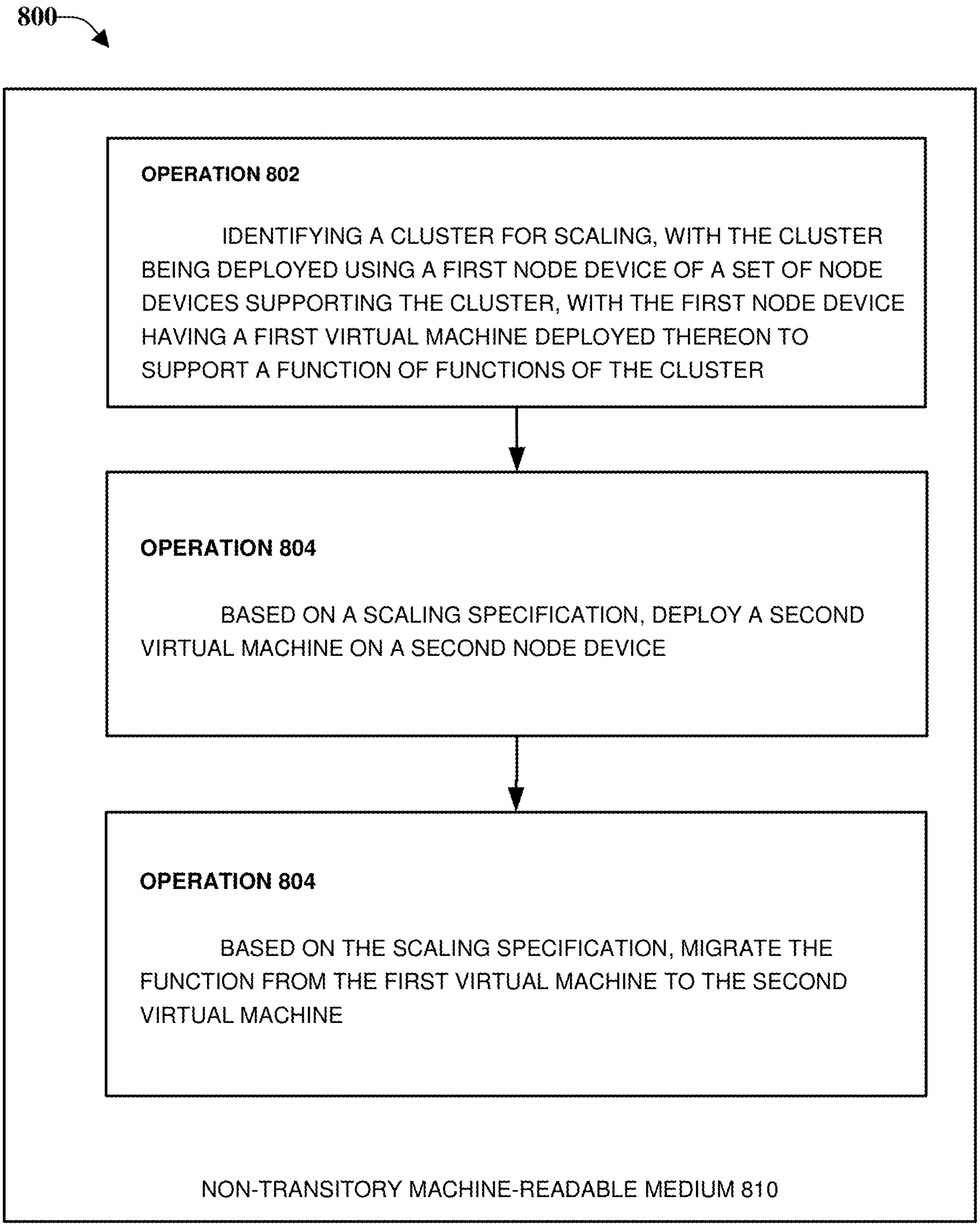

FIG. 8

MIGRATING A FUNCTION BETWEEN VIRTUAL MACHINES

BACKGROUND

Modern data systems can operate functions within virtual machines. Different approaches can be used to improve the performance and scalability of virtual machines. In some circumstances, improvements to performance of a virtual machine can be achieved by changing resources allocated to the virtual machine. Often, the operation of virtual machines can be improved by utilizing different server equipment.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can include a processor and a memory that stores executable instructions that, when executed by the processor, facilitate performance of operations. The instructions can include an instruction to identify a cluster for scaling, with the cluster being deployed using a first node device of a set of node devices supporting the cluster, and with the first node device has a first virtual machine deployed thereon to support a function of functions of the cluster. The instructions can further include an instruction to, based on a scaling specification, deploying, by the system, a second virtual machine on a second node device. The instructions can include an instruction to, based on the scaling specification, migrating, by the system, the function, from the first virtual machine to the second virtual machine.

Additionally, or alternatively, the second node device was not included in the set of node devices supporting the cluster, migrating the function can include integrating the second node device into the set of node devices resulting in the second node device being included in the set of node devices supporting the cluster. Additionally, or alternatively, the instructions can further include an instruction to identify the cluster for scaling that monitors the functions of the cluster based on a scaling condition. Additionally, or alternatively, based on the monitoring and the scaling condition, the function for migrating can be identified, resulting in an identified function, and based on the identified function, the scaling specification can be generated based on the scaling condition and the second node device.

Additionally, or alternatively, the scaling condition can include a threshold level of performance for a characteristic of the cluster, and identifying the function for the migrating can include identifying that the function requires additional capacity than what is available for operation of the function, with the characteristic of the cluster defined according to a performance level with respect to the threshold level of performance, and with the second node device being selected based on the additional capacity being available.

Additionally, or alternatively, the operation of the cluster with the characteristic can include the operation of the cluster according to a relation with the performance for the characteristic exceeding the threshold level of performance, and with the different capacity including an additional capacity beyond the currently available capacity allocated to operation of the function. Additionally, or alternatively, the characteristic of the cluster can include a level of throughput for the function, and the different capacity can include a different processing capacity to facilitate a change in the level of throughput for the function. Additionally, or alternatively, the operation of the cluster with the characteristic of the cluster can include the operation of the cluster according to a relation with the performance for the characteristic being lower than the threshold level of performance, and with the different capacity including less capacity than the currently available capacity allocated to operation of the function.

Additionally, or alternatively, migrating the function can include, based on the identified function and the scaling specification, identifying the first node device for replacement. Additionally, or alternatively, the second node device was selected based on a first specification of the first node device, and the second node device was selected in accordance with a second specification, different from the first specification, generated in accordance with the first specification and the scaling specification. Additionally, or alternatively, migrating the function from the first virtual machine to the second virtual machine comprises orchestrating the migrating by suspending operation of the first node device, flushing caches of the first node device associated with operation of the first virtual machine, migrating a journal of the first virtual machine to be accessed by the second virtual machine, and starting the second virtual machine with access to the journal.

An example method can include receiving a scaling specification that specifies resources to be allocated to support a target virtual machine and, based on the resources, configuring the target virtual machine for performance of a function of a cluster. The method can further include receiving a journal associated with a source virtual machine, with the source virtual machine performing the function until operation of the source virtual machine was suspended. Further, the method can include, based on a migration of the function to the target virtual machine, starting the target virtual machine.

Additionally, or alternatively, the method can include the scaling specification being received based on a determination that the source virtual machine was performing the function subject to a performance condition. Additionally, or alternatively, the performance condition can include a throughput of data associated with the function being in a state that implicates a change in the throughput of data. Additionally, or alternatively, the method can include the scaling specification being generated to achieve the change in the throughput of data based on the resources to be allocated to support the target virtual machine being determined to be different than other resources that were allocated to support the source virtual machine. Additionally, or alternatively, the method can include the source virtual machine being integrated into a group of virtual machines to perform functions of the cluster, and integrating the target virtual machine into the group of virtual machines, resulting in the target virtual machine replacing the source virtual machine.

An example non-transitory computer-readable medium can include instructions that, in response to execution, cause a system including a processor to perform operations. These operations can include, based on first application data, an operation to identify a cluster deployed using first component equipment of a group of component equipment supporting the cluster, with a first virtual machine being deployed via the first component equipment to support a function of functions of the cluster. The operations can further include, based on a scaling specification, deploying a second virtual machine via second component equipment. The operations can further include, based on the scaling specification, migrating the function from the first component equipment to the second virtual machine.

In additional or alternative embodiments, prior to the migrating, the second component equipment can be excluded from the group of component equipment supporting the cluster, and migrating the function can include the second component equipment being in the group of component equipment supporting the cluster. In additional or alternative embodiments, the cluster was identified based on a scaling condition used to monitor performance of the function, and based on the monitoring and the scaling condition, identifying the function for the migrating, and based on the identified function the scaling specification was generated based on the scaling condition and the second component equipment. In additional or alternative embodiments, the cluster was identified based on a request to migrate the function received from a client device that utilizes the function. In additional or alternative embodiments, the request to migrate the function includes an instruction that the first component equipment is to be replaced with the second component equipment.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 is architecture diagram of an example system that can facilitate migrating a function between virtual machines, in accordance with one or more embodiments.

FIG. 8 depicts an example non-transitory machine-readable medium that can include executable instructions that, when executed by a processor of a system, can facilitate migrating a function between virtual machines, in accordance with one or more embodiments.

DETAILED DESCRIPTION

Generally speaking, one or more embodiments described herein can facilitate migrating a function between virtual machines. One or more embodiments can use different approaches to retrieve data from streaming storage.

As is understood by one having skill in the relevant art(s), given the description herein, the implementation(s) described herein are non-limiting examples, and variations to the technology can be implemented. For instance, even though many examples described herein discuss cloud storage devices, the technologies described herein can be used in many applicable circumstances, e.g., storing streams data with other types of data storage. As such, any of the embodiments, aspects, concepts, structures, functionalities, implementations and/or examples described herein are non-limiting, and the technologies described and suggested herein can be used in various ways that provide benefits and advantages to data manipulation system technology in general, both for existing technologies and technologies in this and similar areas that are yet to be developed.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Generally, one or more embodiments can facilitate the use of cloud storage systems for the storage and retrieval of streaming data, e.g., a continuous and unbounded data flow that can be generated by various data sources with high data volumes and velocity.

Figure 1:
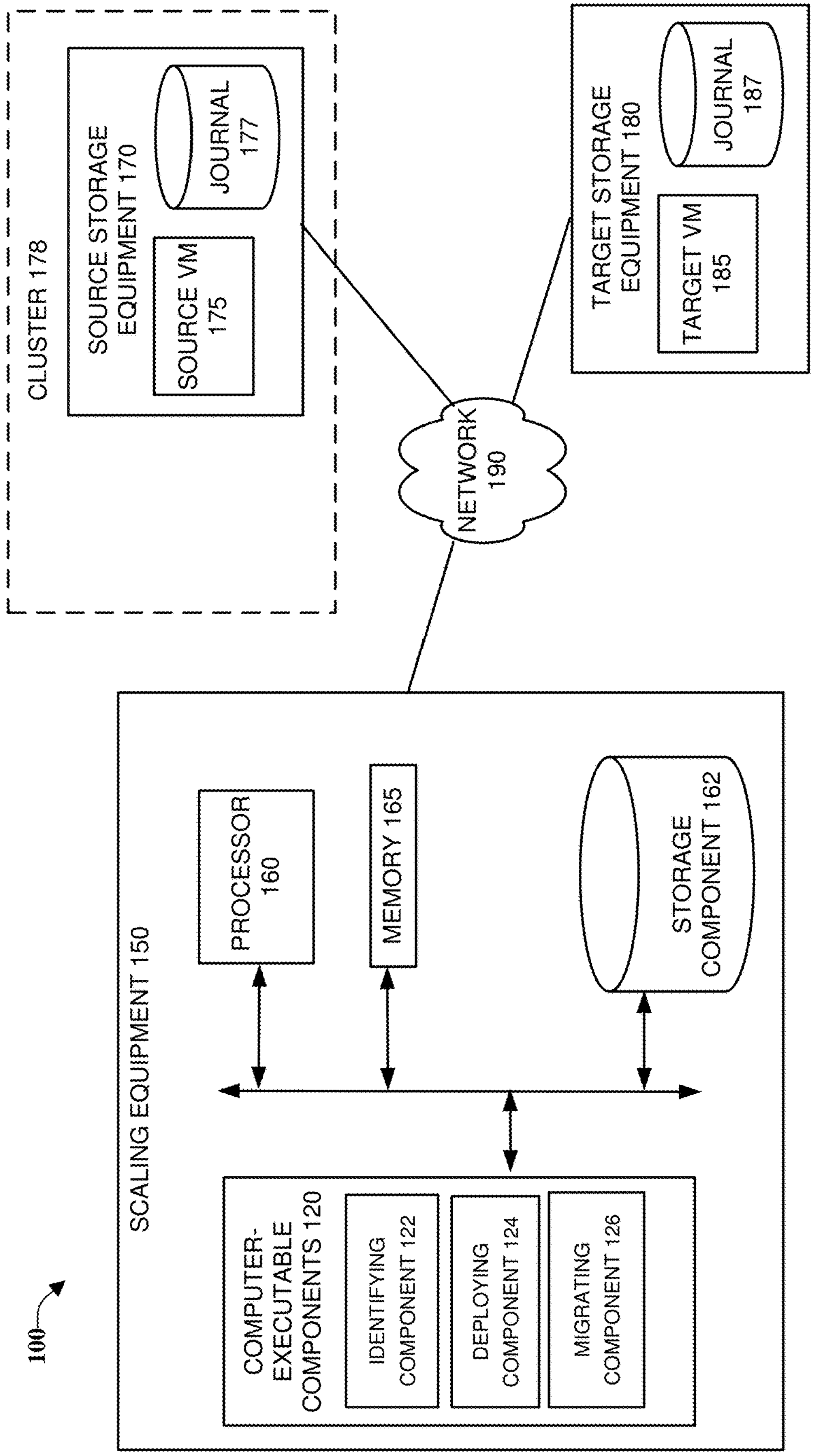
FIG. 1 is an architecture diagram of an example system that can facilitate migrating a function between virtual machines, in accordance with one or more embodiments.

FIG. 1 is an architecture diagram of an example system 100 that can facilitate migrating a function between virtual machines, in accordance with one or more embodiments. For purposes of brevity, description of like elements and/or processes employed in other embodiments is omitted. As depicted, system 100 includes scaling equipment 150 connected to source storage equipment 170, and target storage equipment 180 via network 190. Source storage equipment 170 includes source VM 175 and journal 177, and target storage equipment 180 includes target VM 185 and journal 187. System 100 further includes cluster 178, with functions of cluster 178 supported by source storage equipment 170 and other storage equipment with other virtual machines (not shown). In some implementations cluster 178 can be supported by a set of node devices, also termed a nodepool, herein. As used herein, a nodepool refers to a logical grouping of storage nodes within the cluster, e.g., cluster 178. A storage node, also known as a storage equipment, e.g., storage equipment 170. In embodiments, a nodepool may facilitate management and organization of storage resources within the cluster, e.g., a group/set of associated nodes within a cluster that have the same configuration, e.g., groups of disk pools spread across similar, or compatible, storage nodes.

Scaling equipment 150 includes memory 165, processor 160, and storage component 162. According to multiple embodiments, memory 165 of scaling equipment 150 can store one or more computer and/or machine readable, writable, and/or executable components 120 and/or instructions.

In one or more embodiments, computer-executable components 120, when executed by processor 160, can facilitate performance of operations defined by the executable component(s) and/or instruction(s). Computer executable components 120 can include identifying component 122, deploying component 124, migrating component 126, and other components described or suggested by different embodiments described herein, that can improve the operation of system 100 or other systems described herein.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

As discussed further with FIG. 10 below, network 190 can employ various wired and wireless networking technologies. For example, embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3× (5G Option 3×), high speed packet access (HSPA), Z-Wave, Zigbee and other 802.XX wireless technologies and/or legacy telecommunication technologies.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure. In some embodiments, memory 165 can comprise non-volatile random-access memory (NVRAM), with different uses including journaled manipulation of storage component 162 data and the enabling of concurrent updating of some types of stored data, in accordance with one or more embodiments.

It is understood that the computer processing systems, computer-implemented methods, apparatus, and computer program products described herein employ computer hardware and/or software to solve problems that are highly technical in nature (e.g., utilizing cloud storage protocols to store potentially high-velocity unbounded data streams), that are not abstract and cannot be performed as a set of mental acts by a human. For example, a human, or even a plurality of humans, cannot efficiently handle the complex, rapid storage of streaming data according to cloud storage provider requirements.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of identifying component 122, which can in some implementations, identify a cluster for scaling, deployed using a first node device of a set of node devices supporting the cluster, wherein the first node device has a first virtual machine deployed thereon to support a function of functions of the cluster. For example, one or more embodiments can identify cluster 178 for scaling, deployed using a source storage equipment 170 having source VM 175 deployed thereon to support a function of functions of the cluster.

In another example, memory 165 can store executable instructions that can facilitate generation of deploying component 124, which can, in some implementations, based on a scaling specification, deploy a second virtual machine on a second node device. For example, one or more embodiments, deploying component 124 can, based on a scaling specification, deploy target VM 185 on target storage equipment 180.

In another example, memory 165 can store executable instructions that can facilitate generation of migrating component 126, which in some implementations can, based on the scaling specification, migrate the function from the first virtual machine to the second virtual machine. For example, one or more embodiments can, based on the scaling specification, migrate the function, from source VM 175 to target VM 185.

It is appreciated that the embodiments of the subject disclosure depicted in various figures disclosed herein are for illustration only, and as such, the architecture of such embodiments are not limited to the systems, devices, and/or components depicted therein. For example, in some embodiments, scaling equipment 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

It should be noted that scaling equipment 150, and other equipment discussed herein, can execute code instructions that may operate on servers or systems, remote data centers, or 'on-box' in individual client information handling systems, according to various embodiments herein. In some embodiments, it is understood any or all implementations of one or more embodiments described herein can operate on a plurality of computers, collectively referred to as scaling equipment 150. For example, one or more of scaling equipment 150, and other equipment discussed herein can all be separate subsystems running in the kernel of a computing device as well as operating on separate network equipment, e.g., as depicted in FIG. 1.

Example data storage systems which can employ one or more of the approaches described with embodiments herein include, but are not limited to, EMC ISILON®, a non-limiting example network attached storage (NAS) platform provided by DELL EMC, Inc. Example storage array devices which can employ one or more of the approaches described with embodiments herein include, but are not limited to, POWERSCALE® enterprise data storage array system provided by DELL EMC, Inc.

Figure 2:
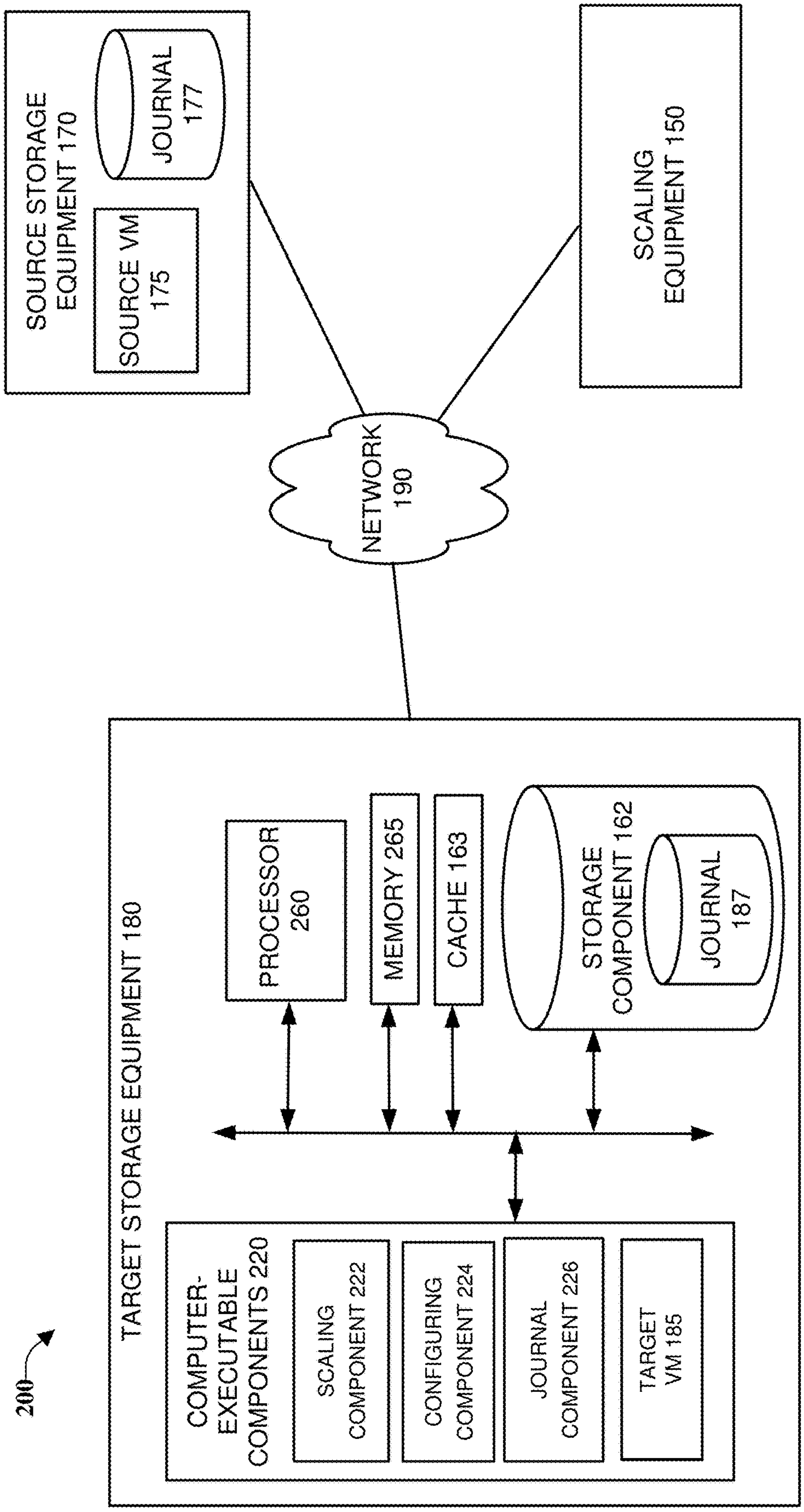
FIG. 2 is an architecture diagram of an example system that can facilitate migrating a function between virtual machines, in accordance with one or more embodiments.

FIG. 2 is an architecture diagram of an example system 200 that can facilitate migrating a function between virtual machines, in accordance with one or more embodiments. For purposes of brevity, description of like elements and/or processes employed in other embodiments is omitted. As depicted, system 200 includes scaling equipment 150 connected to source storage equipment 170 and target storage equipment 180 via network 190. Source storage equipment 170 includes source VM 175 and journal 177.

As depicted, target storage equipment 180 can include processor 260 (e.g., similar to processor 160) and storage device 262 (e.g., similar to storage component 162 with journal 187). According to multiple embodiments, target storage equipment 180 can further include memory 265 (similar to memory 165) that can store one or more computer and/or machine readable, writable, and/or executable components 220 and/or instructions that, when executed by processor 260, can facilitate performance of operations defined by the executable component(s) and/or instruction(s). According to multiple embodiments, memory 265 can store one or more computer and/or machine readable, writable, and/or executable components 220 and/or instructions, which can, when executed by processor 260, facilitate performance of operations defined by the executable component including scaling component 222, configuring component 224, journal component 226, target VM 185, and other components described or suggested by different embodiments described herein, that can improve the operation of system 200.

In one or more embodiments, computer executable components 220 can be used in connection with implementing one or more of the systems, devices, components, and/or computer-implemented operations shown and described in connection with FIG. 2 or other figures disclosed herein. In an example implementation of target storage equipment 180, memory 265 can store executable instructions that can facilitate generation of scaling component 222, which in some implementations, can receive a scaling specification that specifies resources to be allocated to support a target virtual machine. For example, in one or more embodiments, target storage equipment 180 can receive a scaling specification that specifies resources to be allocated to support target VM 185.

In an additional example implementation of target storage equipment 180, memory 265 can store executable instructions that can facilitate generation of configuring component 224, which in some implementations, can, based on the resources, configure the target virtual machine for performance of a function of a cluster. For example, in one or more embodiments, configuring component 224 can, based on the resources, configure target VM 185 for performance of a function of cluster 178.

In an additional example implementation of target storage equipment 180, memory 265 can store executable instructions that can facilitate generation of journal component 226, which in some implementations, can receive a journal associated with a source virtual machine, wherein the source virtual machine performed the function until operation of the source virtual machine was suspended, and based on a migration of the function to the target virtual machine, starting the target virtual machine. For example, in one or more embodiments, journal component 226 can receive journal 177 associated with a source VM 175, with source VM 175 performing the function until operation of source VM 175 was suspended, and based on a migration of the function to target VM 185, starting target VM 185.

Figure 4:
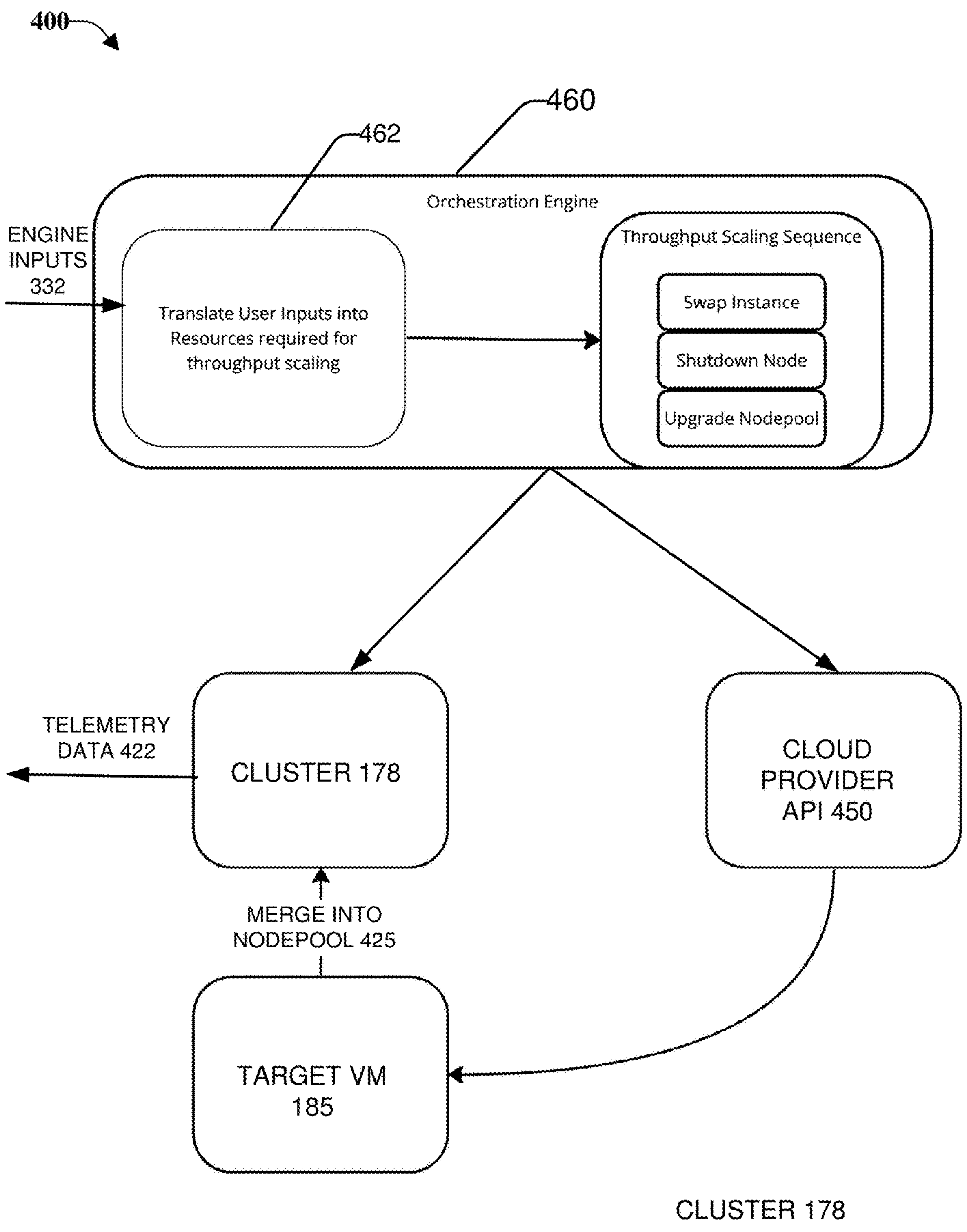
FIG. 4 is architecture diagram of an example system that can facilitate migrating a function between virtual machines, in accordance with one or more embodiments.

FIGS. 3 and 4 are architecture diagrams of connected example systems 300 and 400 that can facilitate migrating a function between virtual machines, in accordance with one or more embodiments. For purposes of brevity, description of like elements and/or processes employed in other embodiments is omitted. As described further below, systems 300 and 400 depict two different approaches to triggering the migration of cluster functions described herein.

Sequence diagram 400 includes exchanges of information between client device 220, orchestration equipment 150, cluster 178, cloud provider application programming interface (API) 450, and target VM 185. At reference number 440, user input is translated, e.g., by client device 220. Example instructions conveyed by the user input include instructions to add a nodepool or expand an existing nodepool.

In a first approach, the migration can be triggered by a request from customer 320. For example, system 300, as depicted, includes customer 320 submitting a customer scaling request 325 via customer user interface (UI) 330 to orchestration engine 460 via engine inputs 332A. Orchestration engine 460 provides instructions to cluster 178 and cloud provider API 450, with target VM being merged at 425 into the pool of storage equipment (e.g., a nodepool of nodes) of cluster 178 based on instructions from cloud provider API 450.

Additionally, or alternatively, in a second approach, instead of a specific request from customer 320 to cause the migration, customer 320 can provide policy rules 350 to monitoring system 346, which can receive telemetry data 422, and these rules can be enforced to generate engine inputs 332B for orchestration engine 460. For example, at reference number 350, the policy rules implemented can include a scaling condition, which can be used to identify the function for migrating, and based on the identified function, policy rules 350, and target storage equipment 180, and a scaling specification can be specified at 342 (e.g., engine inputs 332B) can be generated.

Continuing this example, cluster 178 can capture and provide telemetry 422 to cluster monitor 346, where policy rules 350 can be used as criteria for evaluating telemetry 422. In one or more embodiments, cluster monitor 346 can check telemetry data 422 against policy rules 350, and, if rules are implicated, communicate relevant rules to rule enforcer 342. Based on processing by rule enforcer 342, engine inputs 332B are generated and relayed to orchestration equipment 150 for throughput capacity modification of cluster 178.

In this example, engine inputs 332A-B can be received by resource component 462 and translated into a capacity specification that identifies resources required to increase throughput capacity cluster in accordance with policy rules 350, e.g., by identifying component 122. In one or more embodiments, based on the capacity specification, instructions can be provided to cluster 178 and cloud provider application programming interface (API) 450, to configure and deploy target VM 185 support the cluster and achieve the change in storage capacity, e.g., by deploying component 124. In embodiments, target VM 185 can be merged into the set of node devices (e.g., nodepool) based on instructions from cloud provider API 450, e.g., by merging component 126.

Figure 5:
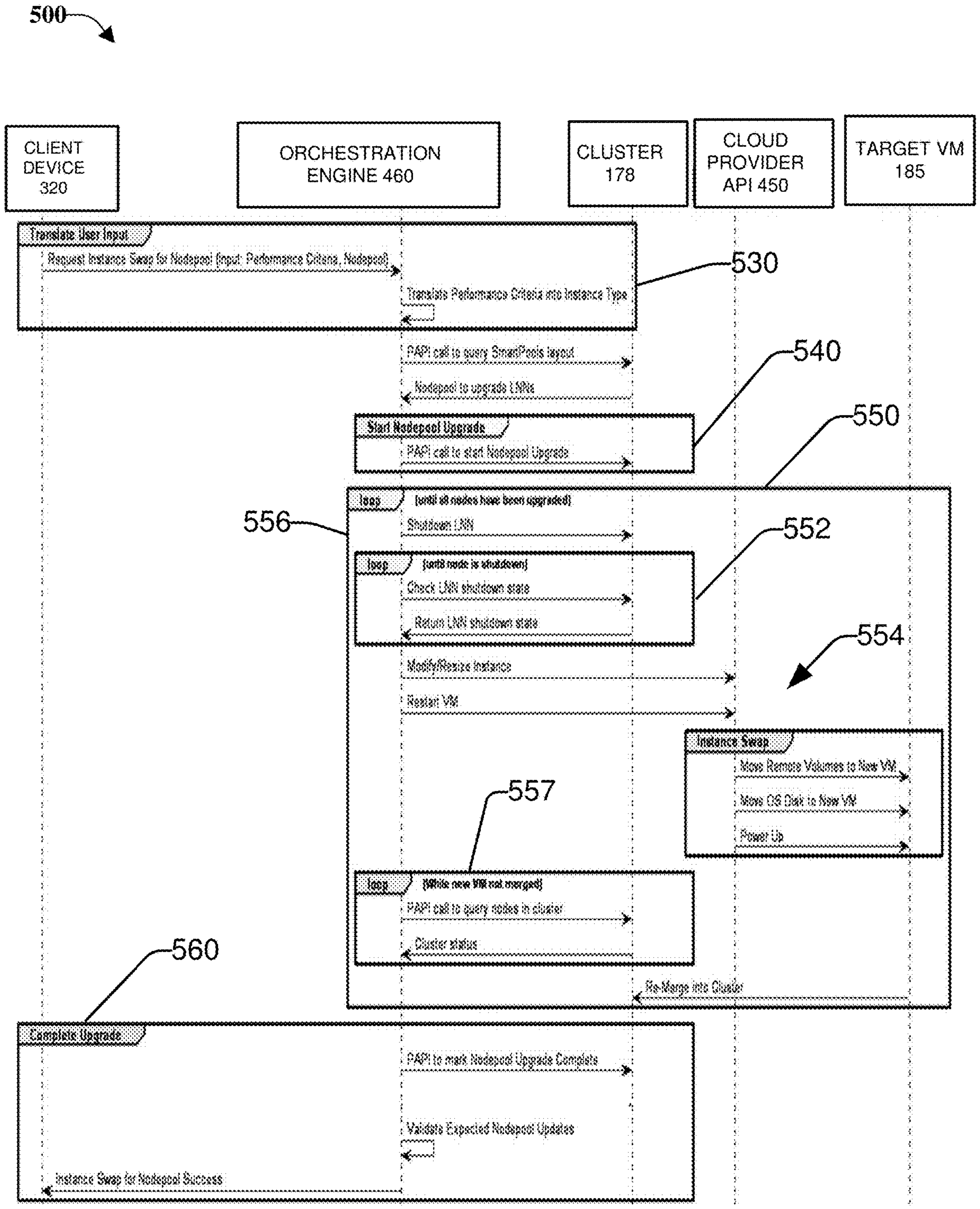
FIG. 5 is an example sequence diagram that illustrates migrating a function between virtual machines, in accordance with one or more embodiments.

FIG. 5 is an example sequence diagram 500 that illustrates migrating a function between virtual machines, in accordance with one or more embodiments. For purposes of brevity, description of like elements and/or processes employed in other embodiments is omitted. Sequence diagram includes exchanges of information between client device 320, orchestration engine 460, cluster 178, cloud provider 450, and target VM 185.

At reference number 530, user input is translated, e.g., by client device 320 requesting an instance swap for nodes (e.g., source storage equipment 170) of cluster 178 based on performance criteria. Based on this request, orchestration engine 460 can translate the performance criteria into an instance type for the instantiation of target VM 185. Based on a platform API (PAPI) call from orchestration engine 460 to cluster 178 and a response from cluster 178 that indicates logical node numbers (LNNs) of nodes of a nodepool to upgrade, e.g., source storage equipment 170 to be upgraded to target storage equipment 180.

At reference number 540, the nodepool upgrade can be commenced based on a PAPI call to cluster 178. At reference number 550, a loop for upgrading all selected nodes can be commenced that includes shutting down each node (e.g., source storage equipment 170) in a loop at reference number 552.

Generally speaking, in this loop, the system iterates through each of the nodes in the nodepool and performs VM swaps one by one, by shutting the node down to ensure that all data is flushed and the journal is saved. Because the contents of the journal may not be able to be saved in some circumstances, this shutdown can ensure that the journal is saved (e.g., to a journal-backup partition on the OS disk). This saving of the journal can improve the likelihood that a subsequent boot will be successful.

Continuing the description of the above approach, the loop continues at reference number 554 with cluster 178 sending instructions to cloud provider 526 to modify/resize target VM 185 and restart source VM 175 for an instance swap between source VM 175 and target VM 185. In some implementations, this instance swap can include moving remote volumes and operating system disks to target VM 185, then powering up target VM 185. Continuing the loop of reference number 556, at reference number 557, while the function has not been completely merged into target VM 185, a PAPI call can be performed to check the status of the migration, and a status can be received from cluster 178. The loop continues until all nodes have been upgraded with target storage equipment 180 being merged into the cluster.

At reference number 560, the upgrade/migration is completed, with a PAPI call from orchestration 522 sending a PAPI message to cluster 178 to notify that the nodepool upgrade has been completed. After orchestration 522 validates the nodepool updates, and provides a notification of the instance swap to client device 320.

Figure 6:
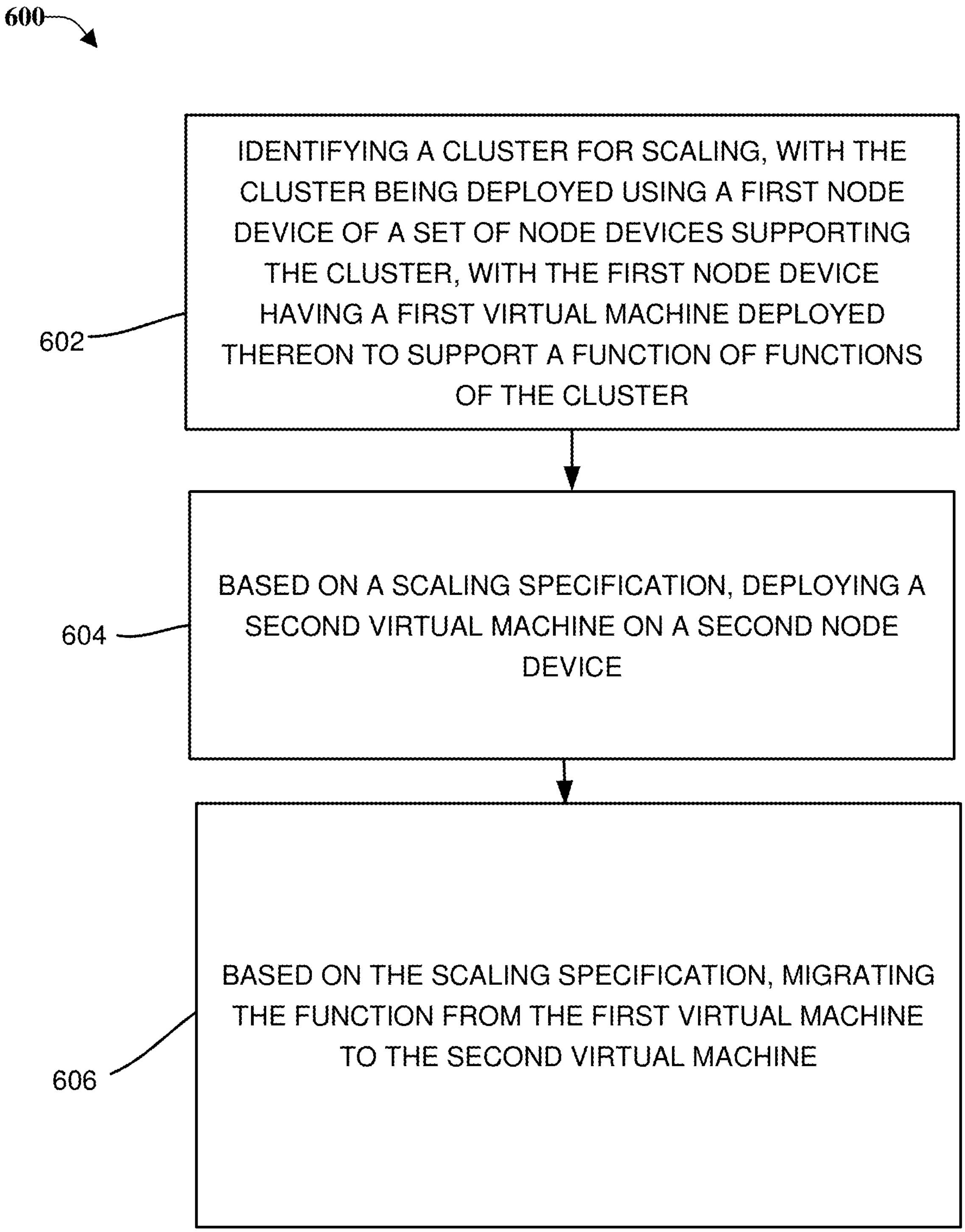
FIG. 6 depicts a flow diagram representing example operations of an example method that can facilitate migrating a function between virtual machines, in accordance with one or more embodiments.

FIG. 6 depicts a flow diagram representing example operations of an example method 600 that can facilitate migrating a function between virtual machines, in accordance with one or more embodiments. For purposes of brevity, description of like elements and/or processes employed in other embodiments is omitted.

In some examples, one or more embodiments of method 600 can be implemented by identifying component 122, deploying component 124, migrating component 126, and other components that can be used to implement aspects of method 600, in accordance with one or more embodiments. It is appreciated that the operating procedures of method 600 are example operating procedures, and that there can be embodiments that implement more or fewer operating procedures than are depicted, or that implement the depicted operating procedures in a different order than as depicted.

At 602 of method 600, identifying component 122 can, in one or more embodiments identify a cluster for scaling, deployed using a first node device of a set of node devices supporting the cluster, wherein the first node device has a first virtual machine deployed thereon to support a function of functions of the cluster. At 604 of method 600, deploying component 124 can, in one or more embodiments, based on a scaling specification, deploy a second virtual machine on a second node device. At 606 of method 600, migrating component 126 can, in one or more embodiments, based on the scaling specification, migrate the function, from the first virtual machine to the second virtual machine.

Figure 7:
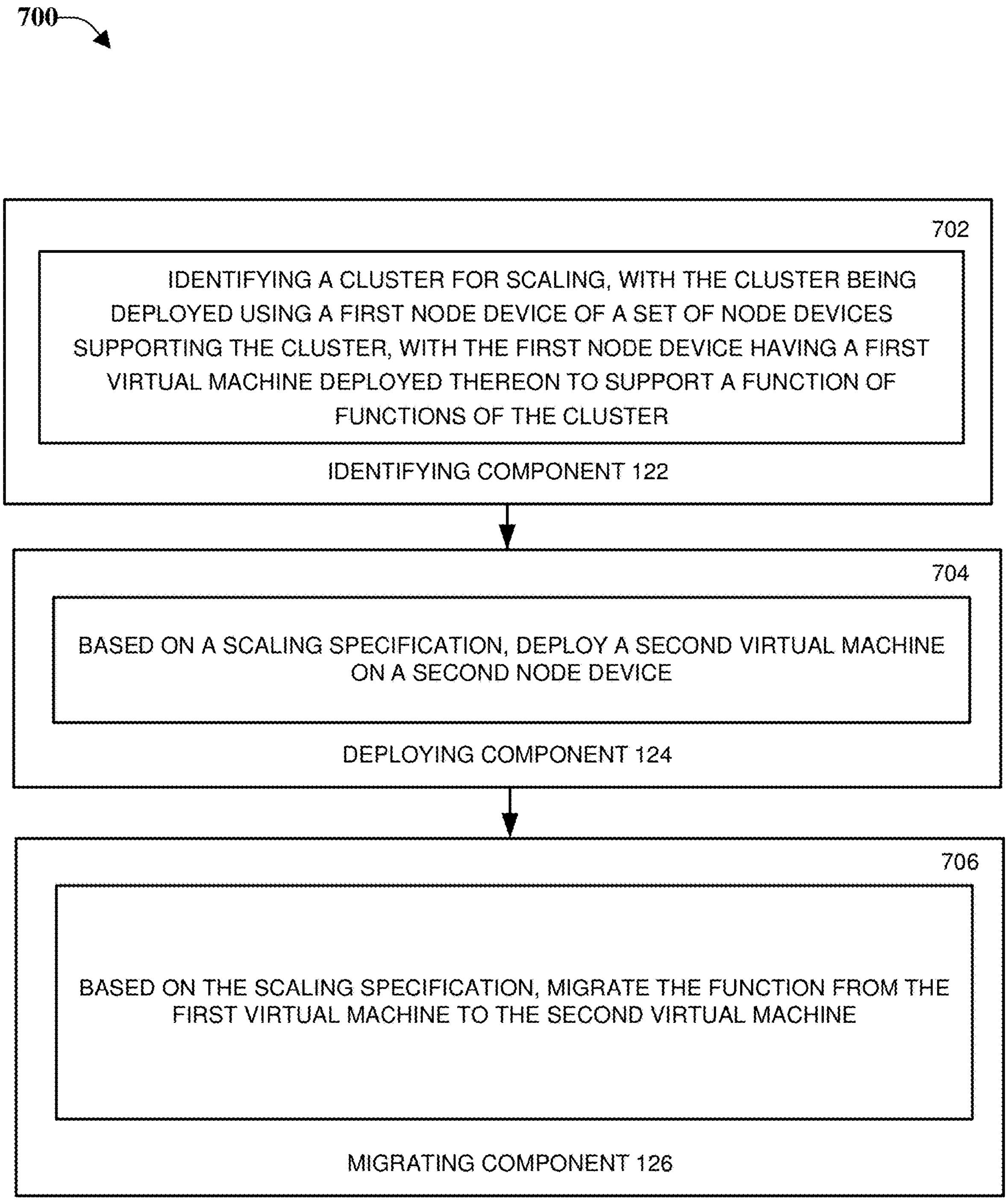
FIG. 7 depicts an example system that can facilitate migrating a function between virtual machines, in accordance with one or more embodiments.

FIG. 7 depicts an example system 700 that can facilitate migrating a function between virtual machines, in accordance with one or more embodiments. For purposes of brevity, description of like elements and/or processes employed in other embodiments is omitted. Example system 700 can include identifying component 122, deploying component 124, migrating component 126, and other components that can be used to implement aspects of system 800, as described herein, in accordance with one or more embodiments.

At 702 of FIG. 7, identifying component 122 can identify a cluster for scaling, deployed using a first node device of a set of node devices supporting the cluster, wherein the first node device has a first virtual machine deployed thereon to support a function of functions of the cluster, in accordance with one or more embodiments. At 704 of FIG. 7, deploying component 124 can, based on a scaling specification, deploy a second virtual machine on a second node device, in accordance with one or more embodiments. At 706 of FIG. 7, migrating component 126 can, based on the scaling specification, migrate the function, from the first virtual machine to the second virtual machine, in accordance with one or more embodiments.

FIG. 8 depicts an example 800 non-transitory machine-readable medium 810 that can include executable instructions that, when executed by a processor of a system, can facilitate migrating a function between virtual machines, in accordance with one or more embodiments. For purposes of brevity, description of like elements and/or processes employed in other embodiments is omitted.

Operation 802 of FIG. 8 can facilitate generation of identifying component 122 which, in one or more embodiments, can identify a cluster for scaling, deployed using a first node device of a set of node devices supporting the cluster, wherein the first node device has a first virtual machine deployed thereon to support a function of functions of the cluster. Operation 804 of FIG. 8 can facilitate generation of deploying component 124, which, in one or more embodiments, can, in accordance with one or more embodiments, based on a scaling specification, deploy a second virtual machine on a second node device. Operation 806 of FIG. 8 can facilitate generation of migrating component 126 which, in one or more embodiments can, based on the scaling specification, migrate the function, from the first virtual machine to the second virtual machine.

Figure 9:
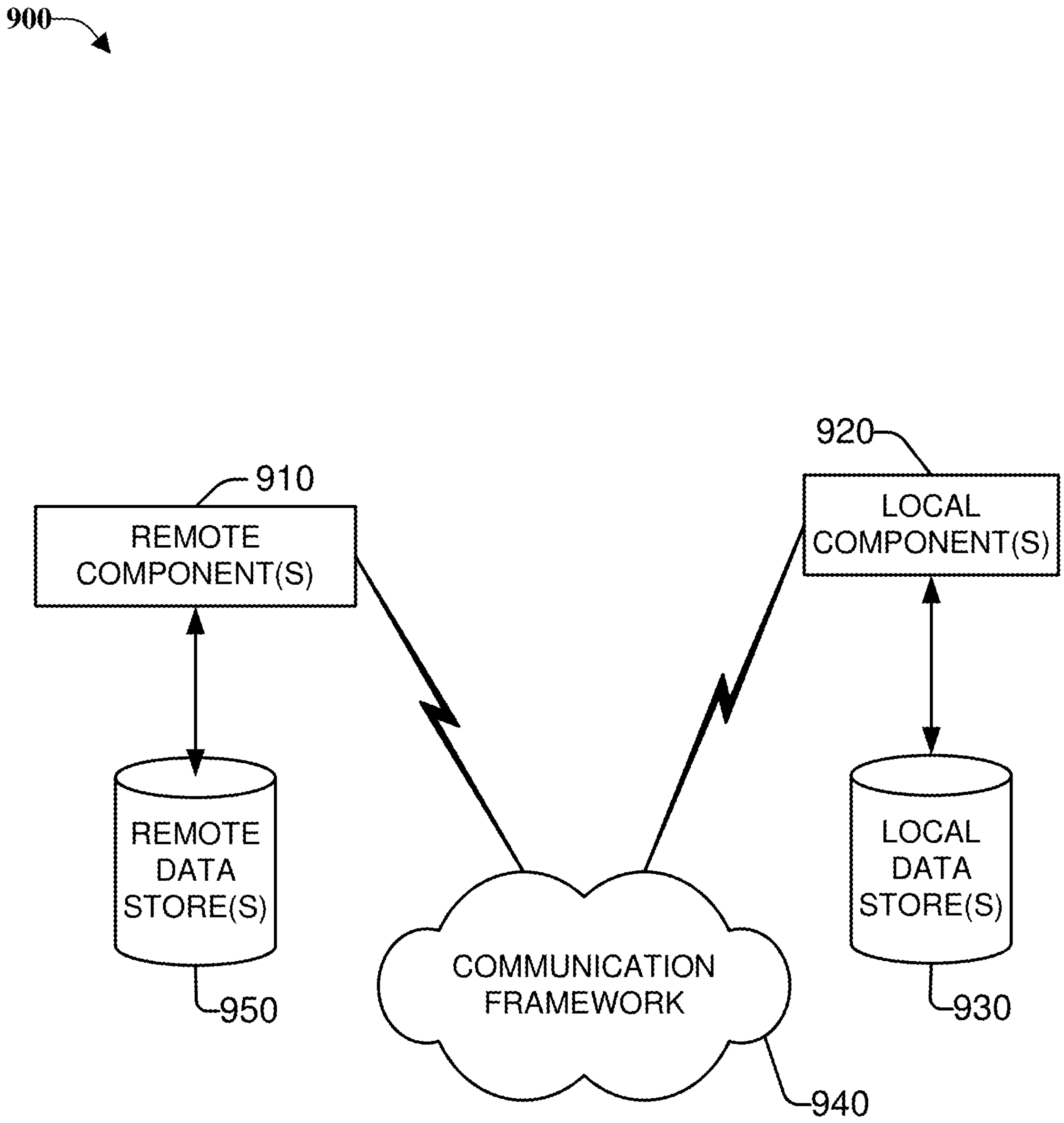
FIG. 9 depicts an example schematic block diagram of a computing environment with which the disclosed subject matter can interact, in accordance with one or more embodiments.

FIG. 9 is a schematic block diagram of a system 900 with which the disclosed subject matter can interact, in accordance with one or more embodiments. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 920, non-volatile memory 922, disk storage 924, and memory storage, e.g., local data store(s) 930 and remote data store(s) 950, for which further description is set forth below.

For instance, non-volatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random-access memory, synchronous dynamic random-access memory, double data rate synchronous dynamic random-access memory, enhanced synchronous dynamic random-access memory, SynchLink dynamic random-access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
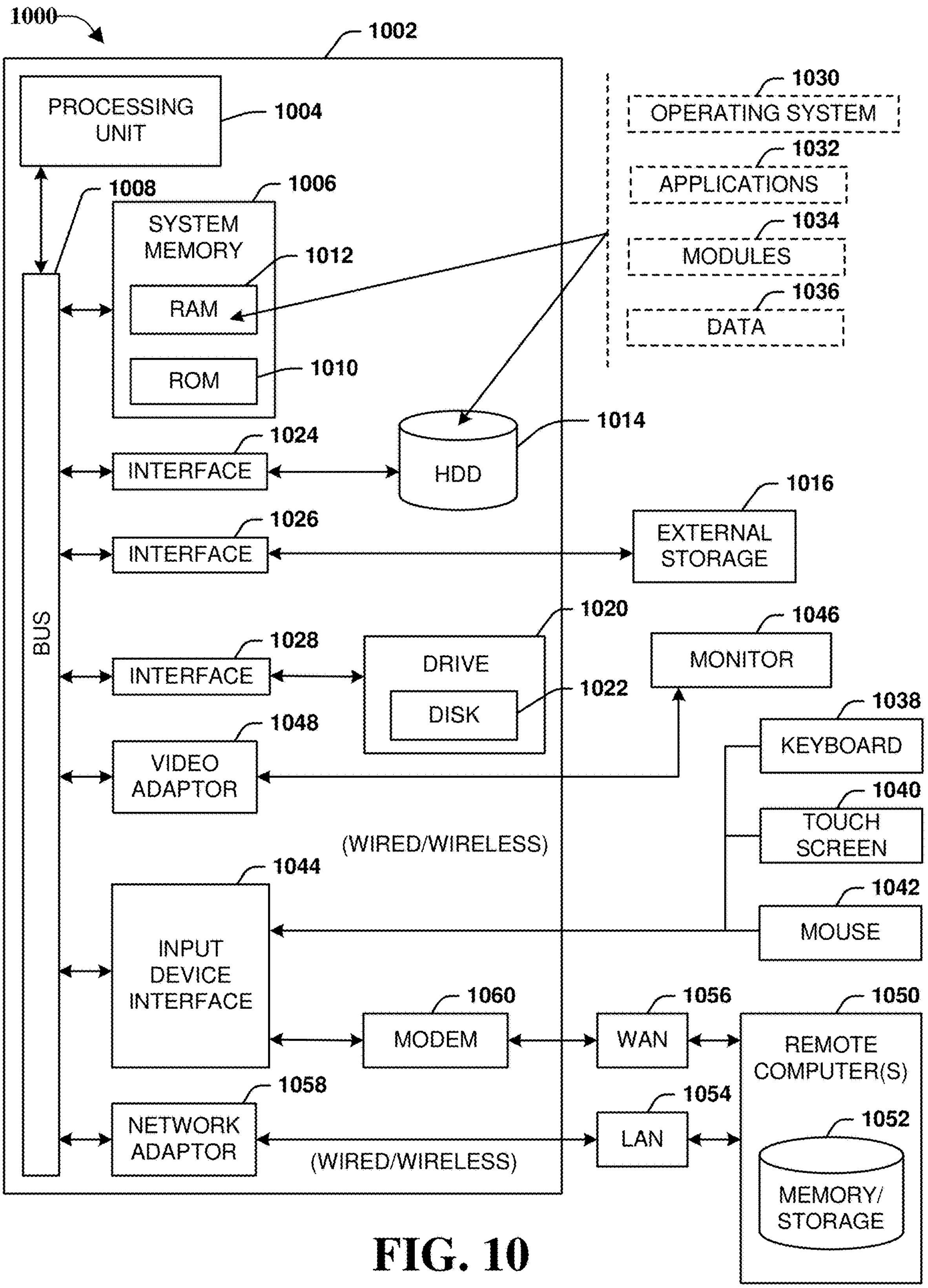
FIG. 10 illustrates an example block diagram of a computer operable to execute an embodiment of this disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and non-volatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide non-volatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations," this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. As mentioned above, it will be appreciated that the memory components, or computer-readable storage media, described herein can be either volatile memory or non-volatile storage, or can include both volatile and non-volatile storage. By way of illustration, and not limitation, non-volatile storage can include ROM, programmable ROM (PROM), EPROM, EEPROM, or flash memory. Volatile memory can include RAM, which acts as external cache memory. By way of illustration and not limitation, RAM can be available in many forms such as SRAM, dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network," "core," "core carrier network," "carrier-side," or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method comprising:

identifying, by an orchestration system comprising at least one processor, a cluster for scaling, wherein the cluster comprises a first node device of a set of node devices supporting the cluster and is hosted by cloud computing equipment associated with a cloud provider, wherein the first node device comprises a first virtual machine deployed thereon to support a function of the cluster;

in response to the identifying, facilitating, by the orchestration system, a shutdown of the first node device, wherein the shutdown of the first node device initiates a flushing of at least one of data or volumes associated with the first node device to a journal of the first virtual machine;

in response to confirming, by the orchestration system, that the journal of the first virtual machine has been saved via the cloud computing equipment at the first node device, communicating, by the orchestration system to the cloud computing equipment, a scaling specification applicable to a second virtual machine deployed on a second node device of the set of node devices, also managed by the cloud computing equipment, wherein, based on the scaling specification, the cloud computing equipment:

scales the second virtual machine, stores the journal on the second node device, and migrates the function from the first virtual machine to the second virtual machine;

facilitating, by the orchestration system, starting the second virtual machine with access to the journal; and employing, by the orchestration system, the function supported by the second virtual machine.

2. The method of claim 1, wherein the second node device was not included in the set of node devices supporting the cluster, and wherein migrating the function comprises integrating the second node device into the set of node devices resulting in the second node device being included in the set of node devices supporting the cluster.

3. The method of claim 1, wherein the identifying of the cluster for scaling comprises:

based on a scaling condition, monitoring the function;

based on the monitoring and the scaling condition, identifying the function for migrating, resulting in an identified function; and based on the identified function, the scaling condition, and the second node device, generating the scaling specification.

4. The method of claim 3, wherein the scaling condition comprises a threshold level of performance for a characteristic of the cluster, wherein identifying the function for the migrating comprises identifying that the function requires additional capacity than what is available for operation of the function with the characteristic of the cluster according to a performance level defined with respect to the threshold level of performance, and wherein the second node device was selected based on the additional capacity being available.

5. The method of claim 4, wherein the operation of the cluster with the characteristic of the cluster according to the performance level comprises the operation of the cluster according to a relation whereby the performance for the characteristic exceeds the threshold level of performance, and wherein the different capacity comprises an additional capacity beyond the currently available capacity allocated to operation of the function and exceeds the currently available capacity allocated to operation of the function.

6. The method of claim 4, wherein the characteristic of the cluster comprises a level of throughput for the function, and wherein the different capacity comprises a different throughput capacity to facilitate a change in the level of throughput for the function.

7. The method of claim 4, wherein the operation of the cluster with the characteristic of the cluster according to the performance level comprises the operation of the cluster according to a relation whereby the performance for the characteristic is lower than the threshold level of performance, and wherein the different capacity comprises less capacity than the currently available capacity allocated to operation of the function.

8. The method of claim 3, wherein the migrating of the function comprises:

based on the identified function and the scaling specification, identifying the first node device for replacement.

9. The method of claim 1, wherein the scaling specification comprises a first scaling specification, and wherein the second node device was selected in accordance with a second scaling specification:

different from the first scaling specification, and generated by the cloud computing equipment in accordance with the first scaling specification.

10. The method of claim 1, wherein the migrating of the function resulted from the orchestration system instructing the cloud computing equipment to:

suspend operation of the first node device; and migrate the journal to be accessed by the second virtual machine.

11. A non-transitory machine-readable medium, comprising executable instructions that, when executed by at least one processor of orchestration equipment, facilitate performance of operations, comprising:

identifying a cluster deployed using first component equipment of a group of component equipment hosted by cloud provider equipment and supporting the cluster, wherein a first virtual machine is deployed via the first component equipment to support a function of the cluster;

based on a scaling specification communicated to the cloud provider equipment, orchestrating:

a shutdown of the first component equipment, a flushing of data associated with the first component equipment to a journal, a scaling of a second virtual machine, different from the first virtual machine, a deployment of the second virtual machine via second component equipment of the group of component equipment, a storing of the journal on the second computing equipment, and a migration of the function from the first virtual machine to the second virtual machine; and employing the function supported by the second virtual machine.

12. The non-transitory machine-readable medium of claim 11, wherein, prior to the migration, the second component equipment was not included in the group of component equipment supporting the cluster, and wherein the migration of the function comprises including the second component equipment in the group of component equipment supporting the cluster.

13. The non-transitory machine-readable medium of claim 11, wherein the cluster was identified based on:

a scaling condition used to monitor throughput of the function, and wherein the operations further comprise:

based on the monitoring and the scaling condition, identifying the function for the migration, resulting in an identified function; and based on the identified function, the scaling condition, and the second component equipment, generating the scaling specification to increase the throughput of the function.

14. The non-transitory machine-readable medium of claim 11, wherein the cluster was identified based on a request to migrate the function received from a client device that utilizes the function.

15. The non-transitory machine-readable medium of claim 14, wherein the request to migrate the function comprises an instruction that the first component equipment be replaced with the second component equipment.

16. An orchestration system, comprising:

at least one processor; and at least one memory that stores executable instructions that, when executed by the at least one processor, facilitate performance of operations, comprising:

identifying a cluster for scaling, wherein the cluster comprises a first node device of node devices supporting the cluster, and is hosted by cloud computing equipment associated with a cloud provider, wherein the first node device comprises a first virtual machine deployed thereon to support a function of the cluster;

in response to the identifying, shutting down the first node device, wherein the shutting down of the first node device initiates a flushing of at least one of data or volumes associated with the first node device to a journal of the first virtual machine;

in response to confirming that the journal of the first virtual machine has been saved via the cloud computing equipment at the first node device, communicating, to the cloud computing equipment, a scaling specification applicable to a second virtual machine deployed via a second node device of the node devices, also managed by the cloud computing equipment, wherein, based on the scaling specification, the cloud computing equipment:

scales the second virtual machine, stores the journal via the second node device, and migrates the function from the first virtual machine to the second virtual machine;

starting the second virtual machine with access to the journal; and executing the function supported by the second virtual machine.

17. The orchestration system of claim 16, wherein the scaling specification was received based on a determination that the first virtual machine was performing the function subject to a performance condition.

18. The orchestration system of claim 17, wherein the performance condition comprises throughput of data associated with the function being in a state that implicates a change in the throughput of data, and wherein the scaling specification was generated to achieve the change in the throughput of data based on the resources to be allocated to support the second virtual machine being determined to be different than other resources that were allocated to support the first virtual machine.

19. The orchestration system of claim 16, wherein the journal comprises a journal of transaction activity of the first virtual machine.

20. The orchestration system of claim 16, wherein the first virtual machine was integrated into a group of virtual machines to perform the function, and wherein the operations further comprise:

integrating the second virtual machine into the group of virtual machines, as a result of which the second virtual machine replaces the first virtual machine.

* * * * *